United States Patent
Takeuchi et al.

(10) Patent No.: US 9,548,168 B2
(45) Date of Patent: Jan. 17, 2017

(54) ROBOT AND EMERGENCY STOP METHOD OF ROBOT

(71) Applicant: Seiko Epson Corporation, Tokyo (JP)

(72) Inventors: Kaoru Takeuchi, Azumino (JP); Tatsuya Matsudo, Kofu (JP)

(73) Assignee: Seiko Epson Corporation (JP)

( * ) Notice: Subject to any disclaimer, the term of this patent is extended or adjusted under 35 U.S.C. 154(b) by 221 days.

(21) Appl. No.: 14/202,631

(22) Filed: Mar. 10, 2014

(65) Prior Publication Data

US 2015/0027862 A1 Jan. 29, 2015

(30) Foreign Application Priority Data

Jul. 26, 2013 (JP) ................. 2013-155343

(51) Int. Cl.
- *H01H 3/16* (2006.01)
- *H01H 3/02* (2006.01)
- *B25J 19/06* (2006.01)

(52) U.S. Cl.
CPC ............ *H01H 3/0226* (2013.01); *B25J 19/06* (2013.01); *H01H 3/022* (2013.01); *H01H 2300/028* (2013.01)

(58) Field of Classification Search
CPC ....... B25J 19/0025; B25J 19/06; H01H 3/022; H01H 3/0226; H01H 2003/024; H01H 2003/0246; H01H 13/00; H01H 2021/225; H01H 2300/026; H01H 2300/028

See application file for complete search history.

(56) References Cited

U.S. PATENT DOCUMENTS

| | | | | |
|---|---|---|---|---|
| 5,212,433 A | * | 5/1993 | Yasuyuki | B25J 9/1674 200/1 V |
| 5,807,408 A | * | 9/1998 | Ruiz | F16P 3/12 318/446 |
| 8,150,551 B2 | * | 4/2012 | Kaneko | B25J 19/005 455/462 |
| 2005/0209734 A1 | * | 9/2005 | Tanaka | F16P 3/003 700/245 |
| 2008/0150467 A1 | * | 6/2008 | Hashimoto | B25J 9/1676 318/568.17 |
| 2008/0255704 A1 | * | 10/2008 | Braut | B25J 13/02 700/264 |
| 2009/0149995 A1 | * | 6/2009 | Kaneko | B25J 19/005 700/258 |
| 2010/0106299 A1 | * | 4/2010 | Nagata | B25J 13/06 700/264 |

FOREIGN PATENT DOCUMENTS

| | | |
|---|---|---|
| JP | 2008-049462 A | 3/2008 |
| JP | 2009-142080 A | 6/2009 |
| JP | 2011-062794 A | 3/2011 |

* cited by examiner

*Primary Examiner* — Thomas G Black
*Assistant Examiner* — Ce Li
(74) *Attorney, Agent, or Firm* — Harness, Dickey & Pierce, P.L.C.

(57) ABSTRACT

A robot includes a power source of the robot, and a switch section adapted to block electrical power supply to the power source. The switch section is disposed on a front side of the robot arranged to face to a workbench when at work. The switch section blocks the electrical power supply to the power source in a case in which it is detected that a distance between the robot and the workbench is longer than a predetermined distance.

13 Claims, 9 Drawing Sheets

ROBOT AND EMERGENCY STOP METHOD OF ROBOT

BACKGROUND

1. Technical Field

The present invention relates to a robot, an emergency stop method of a robot, and so on.

2. Related Art

Industrial robots play an active role in a lot of production sites. In such production sites, according to the principle of separation, robots and humans are physically separated from each other with a guard fence or the like to secure the safety.

However, it is unachievable to separate robots and humans from each other in, for example, a teaching operation to the robots, and there is a possibility that the safety is diminished by, for example, a contact of an arm and so on of the robot with people. Alternatively, there is a case in which the safety is diminished due to an unwanted action (e.g., uncontrollable error) of a robot. Further, there is a demand for prevention of a damage of the robot itself due to the uncontrollable error. In order to cope with such cases as described above, robots are provided with a so-called emergency stop switch. As related art of such an emergency stop switch, there can be cited technologies disclosed in, for example, JP-A-2011-62794 (Document 1) and JP-A-2008-49462 (Document 2). Further, as the related art for resolving a failure due to an unexpected action of a mobile robot in a charging process, there can be cited a technology disclosed in JP-A-2009-142080 (Document 3).

Most of the past industrial robots are based on an assumption that the robots do not move from a workplace after once being installed in the workplace. On the other hand, in recent years, mobile industrial robots coexisting with humans to perform operations are also attracting lots of attention. In the case in which such a robot performs an operation on, for example, a workbench, the robot might be shifted from a work position due to an unexpected cause. In such a case, it is unachievable to normally perform the emergency stop of the robot with the emergency stop switch provided to, for example, the robot main body, which is undesirable in terms of safety.

SUMMARY

According to some aspects of the invention, it is possible to provide a robot, an emergency stop method of a robot, and so on each capable of safely performing an emergency stop in the case in which, for example, the robot moves away from a workbench due to an unexpected cause.

An aspect of the invention relates to a robot including a power source of the robot, and a switch section adapted to block electrical power supply to the power source, wherein the switch section is disposed on a front side of the robot arranged to face to a workbench when at work, and the switch section blocks the electrical power supply to the power source in a case in which it is detected that a distance between the robot and the workbench is longer than a predetermined distance.

According to this aspect of the invention, the switch section is disposed on the front side of the robot arranged to face to the workbench when at work. Further, when it is detected that the distance between the robot and the workbench is longer than the predetermined distance, the switch section blocks the electrical power supply to the power source. By adopting such a configuration, it becomes possible to detect the case, in which the robot working while facing to the workbench in the normal operation moves away from the workbench due to an unexpected cause, as an abnormal state to block the electrical power supply to the power source to thereby achieve the safe emergency stop of the robot.

The aspect of the invention may be configured such that one end of a connection member is attached to the workbench, and the switch section includes an insertion opening to which the other end of the connection member is inserted, and the switch section blocks the electrical power supply to the power source in a case in which the other end of the connection member is pulled out from the insertion opening.

By adopting such a configuration, it is only required to insert the other end of the connection member into the insertion opening of the switch section in, for example, the normal operation of the robot. Further, when the other end of the connection member is pulled out from the insertion opening due to the distance between the robot and the workbench increasing to a distance longer than the predetermined distance, the electrical power supply to the power source is blocked. Thus, the emergency stop of the robot can be achieved. Therefore, it becomes possible to realize the emergency stop of the robot while simplifying the installation operation of the robot and the configuration operation of the safety function.

The aspect of the invention may be configured such that the connection member includes an insertion section to be inserted into the insertion opening, and a wire section having one end attached to the insertion section and the other end attached to the workbench, and the switch section blocks the electrical power supply to the power source in a case in which the insertion section is pulled out.

By using the connection member formed of the insertion section and the wire section as described above, fine-tuning of the installation position of the robot and so on become possible using, for example, the slack of the wire section.

The aspect of the invention may be configured such that the robot further includes a base, and a body section rotatably supported by the base, and the insertion opening is disposed on the front side to the body section.

As described above, by disposing the insertion opening to which the other end of the connection member is inserted on the front side of the body section of the robot, it becomes possible to surely detect the abnormal state of the robot, and at the same time, to achieve the simplification of the configuration operation of the safety function of the robot.

The aspect of the invention may be configured such that the robot further includes at least one arm provided to the body section, and the connection member located outside a movable range of the arm in a state of being inserted in the insertion opening.

By adopting such a configuration, it becomes possible to inhibit the problem of the damage or the abnormal operation of the robot from being caused by the arm having contact with the connection member.

The aspect of the invention may be configured such that the robot further includes a second switch section adapted to achieve emergency stop of the robot, and the electrical power supply to the power source is blocked by at least one of the switch section and the second switch section.

By adopting such a configuration, it becomes possible to block the electrical power supply to the power source by the switch section in the case in which the abnormal state of the robot moving away from the workbench occurs, and also block the electrical power supply to the power source by the operation of the second switch section in the case in which other abnormal state occurs.

The aspect of the invention may be configured such that the second switch section is disposed on a rear side of the robot.

By disposing the second switch section on the rear side of the robot as described above, it becomes possible to surely block the electrical power supply to the power source of the robot by the operation of the second switch section while avoiding the contact with the arms and so on.

The aspect of the invention may be configured such that a first switch of the switch section and a second switch of the second switch section are disposed in series with each other, and the electrical power supply to the power source is blocked by turning OFF at least one of the first switch and the second switch.

By adopting such a configuration, it becomes possible to block the electrical power supply to the power source by the first switch of the switch section in the case in which the robot moves away from the workbench due to an unexpected cause, and block the electrical power supply to the power source by the second switch in the case in which the second switch section is operated by the operator.

The aspect of the invention may be configured such that the robot further includes a robot control section adapted to control the robot, and the switch section blocks the electrical power supply to the power source and the robot control section in a case in which it is detected that the distance between the robot and the workbench is longer than the predetermined distance.

By adopting such a configuration, it becomes possible to block the electrical power supply to the robot control section in the case in which the robot moves away from the workbench due to an unexpected cause.

Another aspect of the invention relates to an emergency stop method of a robot including detecting, by a switch section disposed on a front side of the robot arranged to face to a workbench when at work, that a distance between the robot and the workbench is longer than a predetermined distance, and blocking, by the switch section, electrical power supply to a power source of the robot in accordance with a detection result in the detecting.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, a preferred embodiment of the invention will be explained in detail. It should be noted that the present embodiment explained below does not unreasonably limit the content of the invention as set forth in the appended claims, and all of the constituents set forth in the present embodiment are not necessarily essential as means of the invention for solving the problems.

1. Configuration

Figure 1:
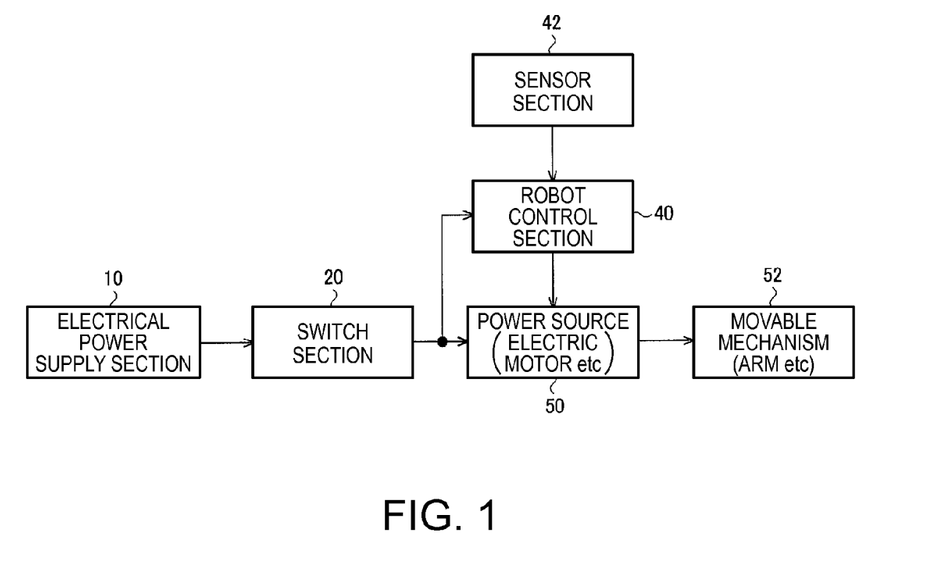
FIG. 1 is a block diagram showing a configuration example of a robot according to an embodiment of the invention.

FIG. 1 is a block diagram showing a configuration example of a robot according to the present embodiment. The robot according to the present embodiment includes a switch section 20, a robot control section 40, a power source 50, and a movable mechanism 52. Further, the robot can include an electrical power supply section 10 and a sensor section 42. It should be noted that the robot according to the present embodiment is not limited to the configuration shown in FIG. 1, but various practical modifications such as elimination of some of the constituents or addition of other constituents are possible.

The electrical power supply section 10 is for supplying each section of the robot with electrical power, and can be formed of, for example, a power supply circuit or a battery. The electrical power supply section 10 can also supply each section of the robot with the electrical power based on an external AC power supply. The electrical power supply section 10 supplies, for example, direct current power based on the battery or the external AC power supply.

The switch section 20 is for performing a switching operation for performing the emergency stop of the robot. For example, in the normal action (normal operation) of the robot, the switch section 20 supplies the power source 50 with the electrical power (the power supply voltage) from the electrical power supply section 10. Further, the switch section 20 supplies the robot control section 40 with the electrical power from the electrical power supply section 10. In contrast, in the case of the emergency stop, the switch section 20 blocks the electrical power supply to the power source 50 and the robot control section 40. In other words, the switch section 20 prevents the electrical power (the power supply voltage) from the electrical power supply section 10 from being supplied to the power source 50 and the robot control section 40. It should be noted that details of the switch section 20 will be described later.

The robot control section 40 is for performing a control process of the robot. The robot control section 40 can be realized by a hardware circuit such as a variety of processors (e.g., a CPU) or an ASIC, a program acting on a processor or the like, and so on. The sensor section 42 is for performing a variety of types of sensing for controlling the robot. The sensor section 42 can be realized by a kinesthetic sensor for performing force control, a visual sensor (a camera) for visual servo, a joint angle detection sensor (a rotary encoder), a posture detection sensor (a gyro sensor, an acceleration sensor, and a clinometer), and so on.

For example, the robot control section 40 controls an electric motor and so on of the power source 50 based on the sensing information from the sensor section 42 to control an action of an arm and so on of the robot. In the case of using the kinesthetic sensor of the sensor section 42, the robot control section 40 performs the force control (impedance control, compliance control) based on the kinesthetic sensor value from the kinesthetic sensor to drive the electric motor of the power source 50 to perform feedback control for moving the arm and so on of the movable mechanism 52. In the case of using the visual sensor of the sensor section 42, the robot control section 40 performs the visual servo control using a taken image obtained from the visual sensor and a reference image to drive the electric motor of the power source 50 to perform the control for moving the arm and soon of the movable mechanism 52.

The power source 50 is for generating the power for working the robot, and can be realized by, for example, an electric motor (a servo motor, a stepping motor, or a linear motor), a hydraulic cylinder, or a pneumatic cylinder. For example, the power source 50 converts the electrical energy derived from the electrical power from the electrical power supply section 10 into the kinetic energy for working the robot. By the power source 50 such as the electric motor and a power transmission mechanism such as reduction gears, an actuator for driving the movable mechanism 52 of the robot such as an arm is realized.

The movable mechanism 52 is a mechanical structure for constituting a movable section of the robot, and corresponds to, for example, an arm or an end effector of the robot, or a moving mechanism of the robot. The arm is formed of links and joints. The end effector is a part having a function of the robot directly acting on a work object, and corresponds to a hand (a gripping section) or a variety of types of tools to be attached to the tip of the arm such as a nut-fastening tool. The moving mechanism of the robot is a mechanism for moving the robot, and corresponds to a wheel mechanism, a walk mechanism, and so on.

2. Emergency Stop Method

Then, the emergency stop method according to the present embodiment will be explained in detail. For example, a normal industrial robot of the related art is physically separated from humans according to the principle of separation. Further, the robot is fixed by an anchor or the like, and usually has no chance to move (be displaced).

On the other hand, in recent years, small-sized mobile industrial robots coexisting with humans to perform operations are attracting lots of attention. Basically, such a robot is mounted of a workbench, or only fixed with a simple fixation method. Alternatively, the robot is mounted on a wagon, and when in use, the wagon is fixed with a simple method such as leveling feet.

Therefore, there is a possibility that the robot is shifted from the work position at which the robot has been placed when, for example, the robot lifts a work with a weight heavier than expected, or the robot acts in an unintended manner. Alternatively, in the worst case (e.g., occurrence of an earthquake), it is possible for the robot to fall down.

In order to ensure the safety of the humans from such an abnormal action of the robot, or in order to prevent damages of the robot itself, the emergency stop switch of the robot is required. Further, in most cases, the emergency stop switch is provided to the robot main body, and it is required for the human to directly operate the emergency stop switch. In other words, the human is required to come closer to the robot in the abnormal state, and there is a problem that the safety cannot sufficiently be ensured.

In order to solve such a problem, in the present embodiment, there is adopted a method of operating the emergency stop switch without requiring a human operation to perform the emergency step of the robot in the case in which, for example, the robot moves from a predetermined place due to an unintended reason, or the robot falls down. For example, the emergency stop switch provided to the robot main body and the workbench (a stationary object in the broad sense) of the robot are connected to each other with a connection member (a wire, a cord) with a predetermined length. Then, in the case in which the relative position between the robot and the workbench is changed due to an unintended movement, the fall, and so on, a pull-type emergency stop switch is made to act to perform the emergency stop of the robot. For example, the switch section 20 shown in FIG. 1 as the emergency step switch blocks the electrical power supply to the power source 50 and the robot control section 40 to perform the emergency stop of the robot. By performing such a process as described above, it becomes possible to perform the emergency stop of the robot without requiring the human operation to thereby achieve increase in safety and so on in the case in which the abnormal state such as an unintended movement or the fall of the robot occurs.

Figure 2A:
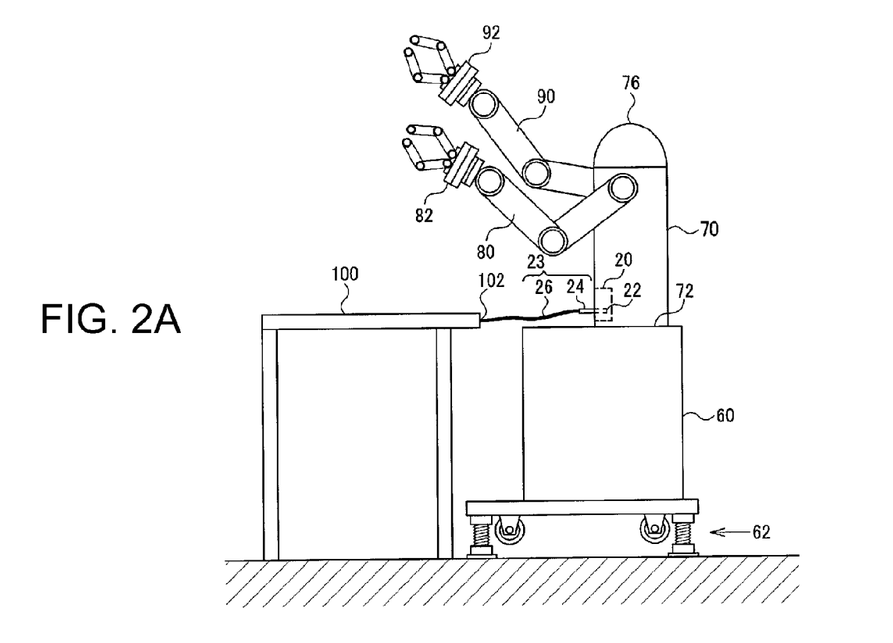
FIGS. 2A and 2B are explanatory diagrams of an emergency stop method according to the embodiment.
Figure 2B:
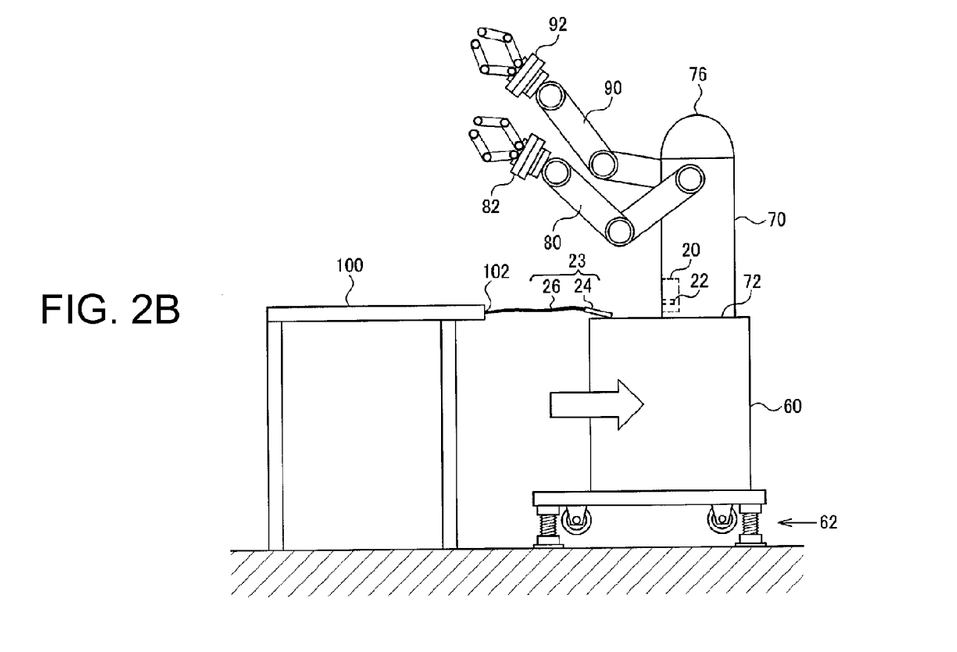

FIGS. 2A and 2B are explanatory diagrams of the emergency stop method according to the present embodiment.

The robot shown in FIG. 2A has a base 60 and a body section 70. Further, the robot also has a head 76. FIG. 2A shows an example of a dual-arm robot, and arms 80, 90 are provided. On the tips (end points) of the arms 80, 90, there are disposed end effectors 82, 92 such as hands, respectively. The robot performs an operation on the work or the like disposed on the workbench 100 using these end effectors 82, 92.

The body section 70 is supported rotatably (in a freely rotatable manner) with respect to the base 60. Specifically, the body section 70 is arranged to be rotatable around a rotary shaft along, for example, a vertical direction due to a joint 72 disposed between the body section 70 and the base 60. The body section 70 rotates with respect to the base 60 using, for example, an electric motor.

The base 60 is provided with a moving mechanism 62 such as a wheel mechanism so as to be movable in the workplace. In FIG. 2A, the robot is fixed by a simple method using the leveling feet and so on so that the robot does not move from a work position after once moving the robot to the work position using the moving mechanism 62.

Further, as shown in FIG. 1, the robot according to the present embodiment has the power source 50 and the switch section 20 for blocking the electrical power supply to the power source 50. By blocking the electrical power supply to the power source 50, the emergency stop of the robot is achieved. Further, as shown in FIG. 2A, the switch section 20 is disposed on the front side of the robot arranged to face to the workbench 100 when at work. Specifically, the robot is moved to the work position where the workbench 100 is located on the front side of the robot using the moving mechanism 62, and is then disposed at the work position. In this case, the switch section 20 is disposed on the front side of the robot facing to the workbench 100.

Further, as shown in FIG. 2A, in the case in which the switch 20 has detected that the distance between the robot and the workbench 100 is longer than a predetermined distance (a given distance), the switch section 20 blocks the electrical power supply to the power source 50. For example, in the case in which the abnormal state of the emergency stop has been detected due to increase in the distance between the robot and the workbench, the switch section 20 blocks the electrical power supply to the power source 50 to thereby complete the emergency stop of the robot. Specifically, in the case in which it is detected that the relative distance between the robot and the workbench 100 has increased, the switch section 20 acts to block the electrical power supply from the electrical power supply section 10 to the power source 50 to thereby complete the emergency stop of the robot.

Further, as shown in FIG. 1, the robot has the robot control section 40. Further, in the case (the case in which the abnormal state of the emergency stop has been detected due to the increase in the distance between the robot and the workbench) it is detected that the distance between the robot and the workbench 100 has increased to a distance longer than a predetermined distance, the switch section 20 also blocks the electrical power supply to the robot control section 40. In other words, by blocking the electrical power supply not only to the power source 50 such as the electric motor, but also to the robot control section 40 for controlling the power source 50, the control operation of the robot is stopped. It should be noted that the practical modification of making the robot control section 40 execute the sequence control in the emergency stop without immediately blocking the electrical power supply to the robot control section 40 when performing the emergency stop is also possible. Further, the predetermined distance is the distance between the robot and the workbench 100 determined to be the distance (with which the emergency stop should be performed) with which the electrical power supply should be blocked, and is a distance defined by, for example, the length of the connection member 23. The predetermined distance can also be variable.

In FIG. 2A, the switch section 20 (the robot) has an insertion opening 22. One end of the connection member 23 is attached to the workbench 100, and the other end of the connection member 23 is inserted into the insertion opening 22. For example, the insertion opening 22 of the switch section 20 is disposed on the front side of the body section 70 of the robot, the other end of the connection member 23 is inserted into the insertion opening 22. Specifically, as described above, the robot has the body section 70 rotatably supported by the base 60, and the insertion opening 22 of the switch section 20 is disposed on the front side of the body section 70.

For example, the connection member 23 has an insertion section 24 to be inserted into the insertion opening 22 of the switch section 20, and a wire section 26. One end of the wire section 26 is attached to the insertion section 24, and the other end of the wire section 26 is attached to the workbench 100 (the stationary object, a work area). For example, the workbench 100 is provided with an attachment section 102 for the wire section 26, and the other end of the wire section 26 (the one end of the connection member) is attached to the attachment section 102. The attachment section 102 can be realized by, for example, a metal fixture for the wire.

Further, as shown in FIG. 2B, in the case in which the other end of the connection member 23 has been pulled out from the insertion opening 22, the switch section 20 blocks the electrical power supply to the power source 50. For example, when the connection member 23 has been pulled out from the insertion opening 22 due to the increase in the distance between the robot and the workbench 100, the switch section 20 blocks the electrical power supply to the power source 50 to thereby perform the emergency stop of the robot. In the case in which the connection member 23 is formed of the insertion section 24 and the wire section 26, the switch section 20 blocks the electrical power supply to the power source 50 in the case in which the insertion section 24 has been pulled out from the insertion opening 22. Thus, the emergency stop of the robot is achieved. For example, the switch section 20 is provided with a pull-type switch, and when the other end (insertion section) of the connection member 23 is pulled out from the insertion opening 22, the pull-type switch is turned OFF. Thus, the electrical power supply line from the electrical power supply section 10 to the power source 50 (the robot control section) is cut, and the emergency stop of the robot is achieved.

It should be noted that although in FIG. 2B, there is explained the method in which the connection member 23 is formed of the insertion section 24 and the wire section 26, and the emergency stop of the robot is performed in the case in which the insertion section 24 is pulled out from the insertion opening 22, the present embodiment is not limited to this example, but a variety of practical modifications can be adopted. For example, a member having the insertion section 24 and the wire section 26 integrated with each other can also be adopted as the connection member 23. Alternatively, it is also possible to realize the connection member 23 only by the insertion section 24 without providing the wire section 26. Alternatively, it is also possible to detect the fact that the distance between the robot and the workbench 100 increases using other methods than such pull-put detection of the connection member 23 as described above, and then perform the emergency stop of the robot. Alternatively, it is also possible to block the electrical power supply to the power source 50 while keeping the state in which the other end (the insertion section) of the connection member 23 is inserted in the insertion opening 22, but is not pulled out from the insertion opening 22. In other words, the electrical power supply to the power source 50 is blocked to achieve the emergency stop of the robot in the state in which the other end of the connection member 23 is fixed to the position of the insertion opening 22. By adopting such a configuration as described above, it becomes possible to inhibit the fall of the robot in the abnormal state making effective use of the connection member 23 for blocking the electrical power supply. Specifically, the connection member 23 having the one end attached to the workbench 100 acts as a support to inhibit the fall of the robot. On this occasion, it is possible to turn OFF the switch of the switch section 20 to block the electrical power supply to the power source 50 when detecting, for example, the fact that the connection member 23 is pulled.

Figure 3:
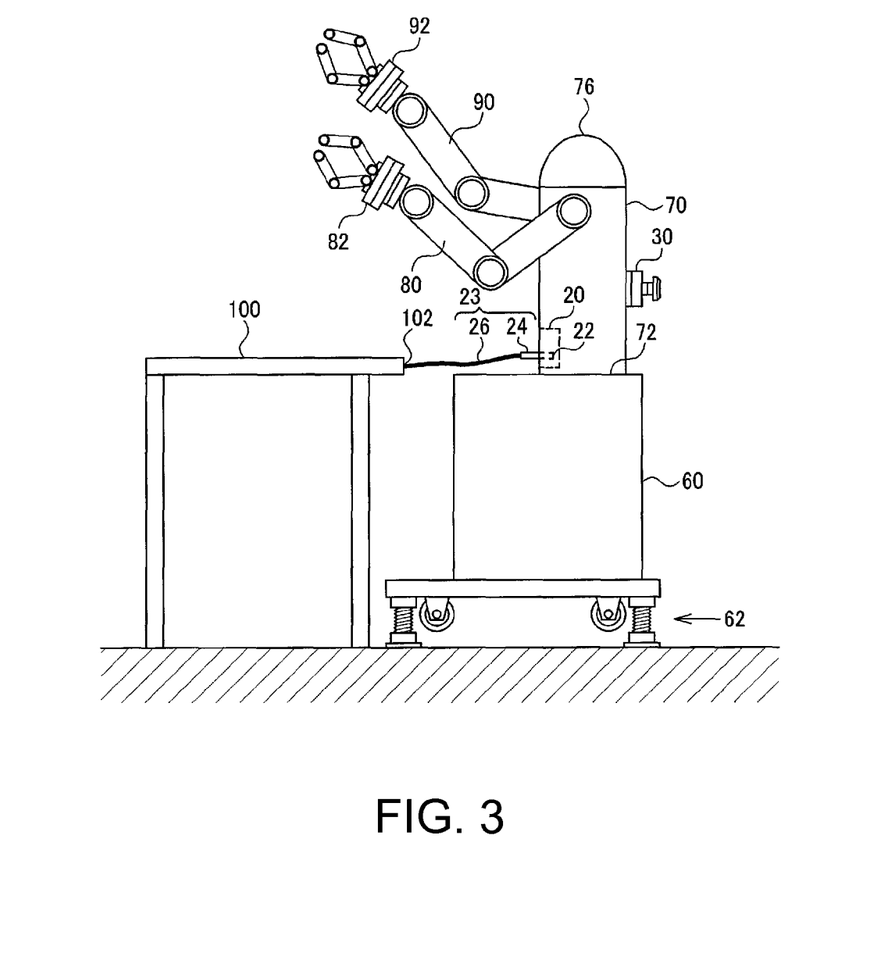
FIG. 3 is an explanatory diagram of a method of disposing a second switch on a rear side of the robot.

Further, in the present embodiment, it is also possible to further provide a second switch section 30 for performing the emergency stop of the robot as shown in FIG. 3. Further, the electrical power supply to the power source 50 (the robot control section 40) is blocked by at least one of the switch section 20 and the second switch section 30. Thus, the emergency stop of the robot is achieved.

For example, in the case in which the distance between the robot and the workbench 100 increases due to the unintended movement or the fall of the robot as shown in FIG. 2B, the switch section 20 blocks the electric power supply to the power source 50 (the robot control section).

On the other hand, in the case in which the operator operates the second switch section 30 for the emergency stop of the robot, the electrical power supply to the power source 50 (the robot control section) is also blocked. In FIG. 3, the second switch section 30 is formed of a push-type switch, and the emergency stop of the robot can be achieved by the human as the operator pushing the second switch section 30.

Here, the switch section 20 is disposed on the front side of the robot, and the second switch section 30 is disposed on the rear side of the robot. For example, the switch section 20 is disposed on the front side of the body section 70, and the second switch section 30 is disposed on the rear side (the back side) of the body section 70. By disposing the second switch section 30 on the rear side of the robot as described above, in the case in which the robot gets into the abnormal state, it is possible for the operator to perform the emergency stop of the robot without regard to the movement of the arms 80, 90.

That is, if the second switch section 30 is disposed on the front side of the robot, there is a problem that the arms 80, 90 of the robot in the abnormal state have contact with the operator to diminish the safety. In this regard, by disposing the second switch section 30 on the rear side of the robot, such a problem can be inhibited from occurring. On the other hand, the switch section 20 automatically acts in response to the increase in the distance between the robot and the workbench 100 to perform the emergency stop. Therefore, the problem of the contact between the operator and the arms 80, 90 does not occur. Further, by disposing the switch section 20 on the front side of the robot, there is obtained the advantage that the unintended movement and the fall of the robot can easily be detected using the method explained with reference to FIGS. 2A and 2B.

Figure 4:
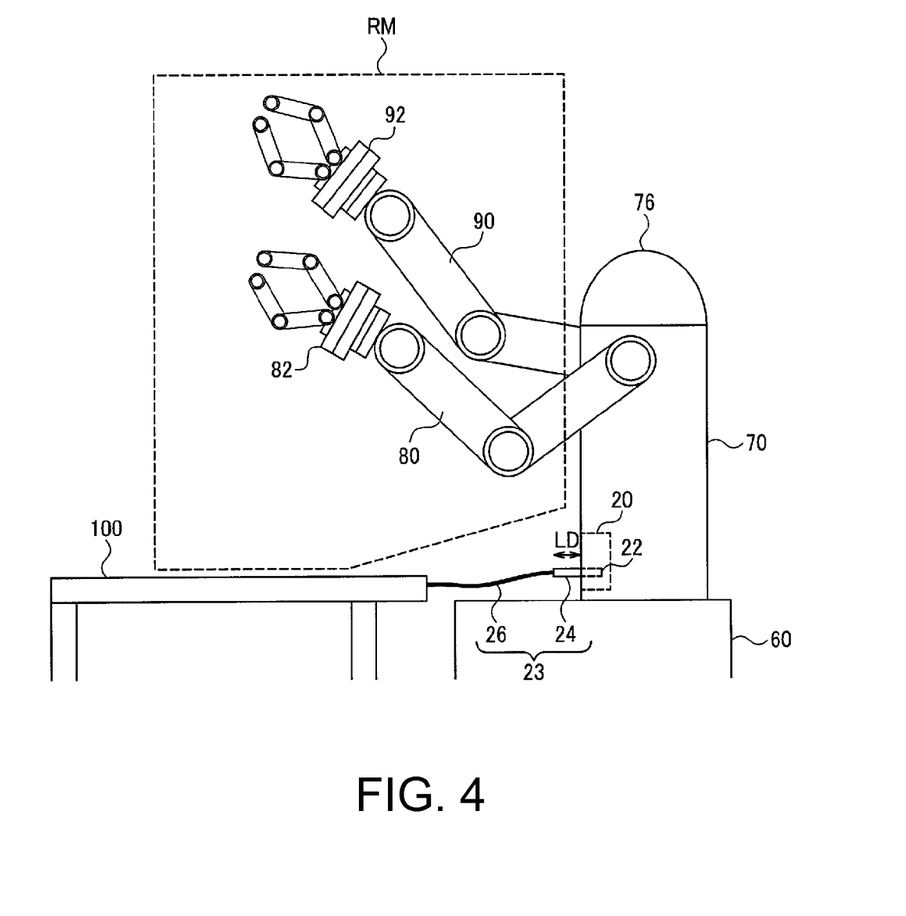
FIG. 4 is an explanatory diagram of a positional relationship between a movable range of arms and a connection member.

Further, in the present embodiment, the robot has the arms 80, 90 (one or more arms) provided to the body section 70. FIG. 4 shows the dual-arm robot, and therefore two arms 80, 90 are provided. It should be noted that the number of arms is not limited to two, but can also be one, or equal to or larger than three.

In this case, in the present embodiment, as shown in FIG. 4, it is arranged that the connection member 23 is located outside the movable range RM (existing range) of the arms 80, 90 (the end effectors 82, 92) in the state of being inserted in the insertion opening 22. Specifically, it is arranged that the projecting part of the insertion section 24 in the state in which the insertion section 24 is inserted in the insertion opening 22 is located outside the movable range RM of the arms 80, 90. For example, the length of the insertion section 24 is configured so that the projecting part of the insertion section 24 in the state of being inserted to the insertion opening 22 has the length LB with which the projecting part is located outside the movable range RM of the arms.

Specifically, as shown in FIGS. 2A and 2B, in the method of detecting the pullout of the connection member 23 to thereby detect the unexpected movement and the fall of the robot, it is desirable to dispose the switch section 20 on the front side of the robot in order to simplify the detection process.

However, in this method, the connection member 23 in the state of being inserted into the insertion opening 22 is located on the front side of the robot when the robot is in the normal operation, and if the arms 80, 90 have contact with the connection member 23, there occurs a problem of a damage of the robot or an abnormal operation of the robot. For example, in the case in which the connection member 23 is formed of the insertion section 24 and the wire section 26, the insertion section 24 projects from the front surface of the robot, and the projecting part might have contact with the arms 80, 90.

In this regard, in the present embodiment, as shown in FIG. 4, it is arranged that the connection member 23 is located outside the movable range RM of the arms 80, 90 in the state of being inserted in the insertion opening 22. Specifically, it is arranged that the projecting part of the insertion section 24 is located outside the movable range RM of the arms 80, 90. The movable range RM is a range known from, for example, the structures of the robot and the arms 80, 90. Therefore, the switch section 20 is disposed so that the connection member 23 does not enter the inside of the movable range RM. For example, since the rams 80, 90 are disposed on the upper side of the body section 70 of the robot, the switch section 20 is disposed on the lower side of the body section 70. For example, the switch section 20 is disposed at a position nearer to the base 60 than to the head 76 of the robot. Further, the length LD of the projecting part of the insertion section 24 is shortened as much as possible to prevent the contact with the arms 80, 90 in the normal operation. By adopting such a configuration, it is possible to inhibit the situation in which the arms 80, 90 have contact with the connection member 23 (the insertion section, the wire section) to thereby cause the damage and the abnormal operation of the robot.

As described above, in the present embodiment, the switch section 20 is disposed on the front side of the robot disposed to face to the workbench 100, and the fact that the robot has moved away from the workbench 100 is detected using the switch section 20 to perform the emergency stop of the robot. Therefore, in the case in which there occurs the unintended movement or the fall of the robot, which works while facing to the workbench 100 in the normal operation, it is possible to detect the abnormal state to perform the emergency stop of the robot. Therefore, since it is possible to automatically detect the abnormal state shown in FIG. 2B to perform the emergency stop of the robot without the intervention of a human operation, the safety and so on can be enhanced.

For example, as described in Document 3, in the method in which a wiring member of a charger is attached to the rear section of the robot to detect the tension of the wiring member, it is not achievable to detect the abnormal state such as the unintended movement or the fall of the robot, which operates normally while facing to the workbench. In contrast, according to the method of the present embodiment of disposing the switch section 20 on the front side of the robot, there is an advantage that the detection of such an abnormal state can easily and simply be realized.

Further, in the present embodiment, only be inserting the other end (the insertion section) of the connection member 23, the one end of which is connected to the workbench 100, to the insertion opening 22 of the switch section 20, the safety function for the emergency stop can be configured. Therefore, for example, in the normal operation of the robot, since the installation operation of the robot to the workbench 100 and the configuration operation of the safety function can be completed only by inserting the other end of the connection member 23 into the insertion opening 22 of the robot, the installation operation of the robot and the configuration operation of the safety function can be simplified.

Further, in the present embodiment, if the robot moves away from the workbench 100 due to the abnormal state such as the unintended movement or the fall of the robot, the other end of the connection member 23 is pulled out from the insertion opening 22 of the robot, and further the switch section 20 detects the pullout of the other end, and thus the abnormal state can be detected. Therefore, it becomes possible to surely detect the abnormal state such as the unintended movement or the fall of the robot with a simple detection mechanism. Specifically, if the robot moves away from the workbench 100, the other end of the connection member 23 is surely pulled out from the insertion opening 22, and therefore, the abnormal state can safely and surely be detected. Further, in the case of restoring the normal operation state after detecting the abnormal state, it is only required to restore the robot to the appropriate installation position, and then inserting the other end of the connection member 23 into the insertion opening 22 again, and therefore, simplification of the installation operation of the robot can be achieved.

Further, by configuring the connection member 23 using the insertion section 24 and the wire section 26, it becomes possible to provide a certain degree of freedom to the installation position of the robot with respect to the workbench 100 using the slack of the wire section 26. In other words, it becomes possible to fine-tune the installation position of the robot using the slack of the wire section 26.

Further, by disposing the second switch section 30 on the rear side of the robot as shown in FIG. 3, even in the case in which an abnormal state other than the state shown in FIG. 2B occurs, it becomes possible to surely perform the emergency stop of the robot due to a manual operation by the operator.

Further, by arranging that the connection member 23 is located outside the movable range RM of the arms 80, 90 as shown in FIG. 4, even in the case of disposing the switch section 20 on the front side of the robot, it becomes possible to avoid the situation in which the arms 80, 90 have contact with the connection member 23 to cause the damage of the robot or the failure such as the abnormal operation. In particular in the method of configuring the connection member 23 with the insertion section 24 and the wire section 26, since the wire section 26 slacks downward, there is an advantage that the contact with the arms 80, 90 is easily avoided.

3. Switch Sections

Figure 5:
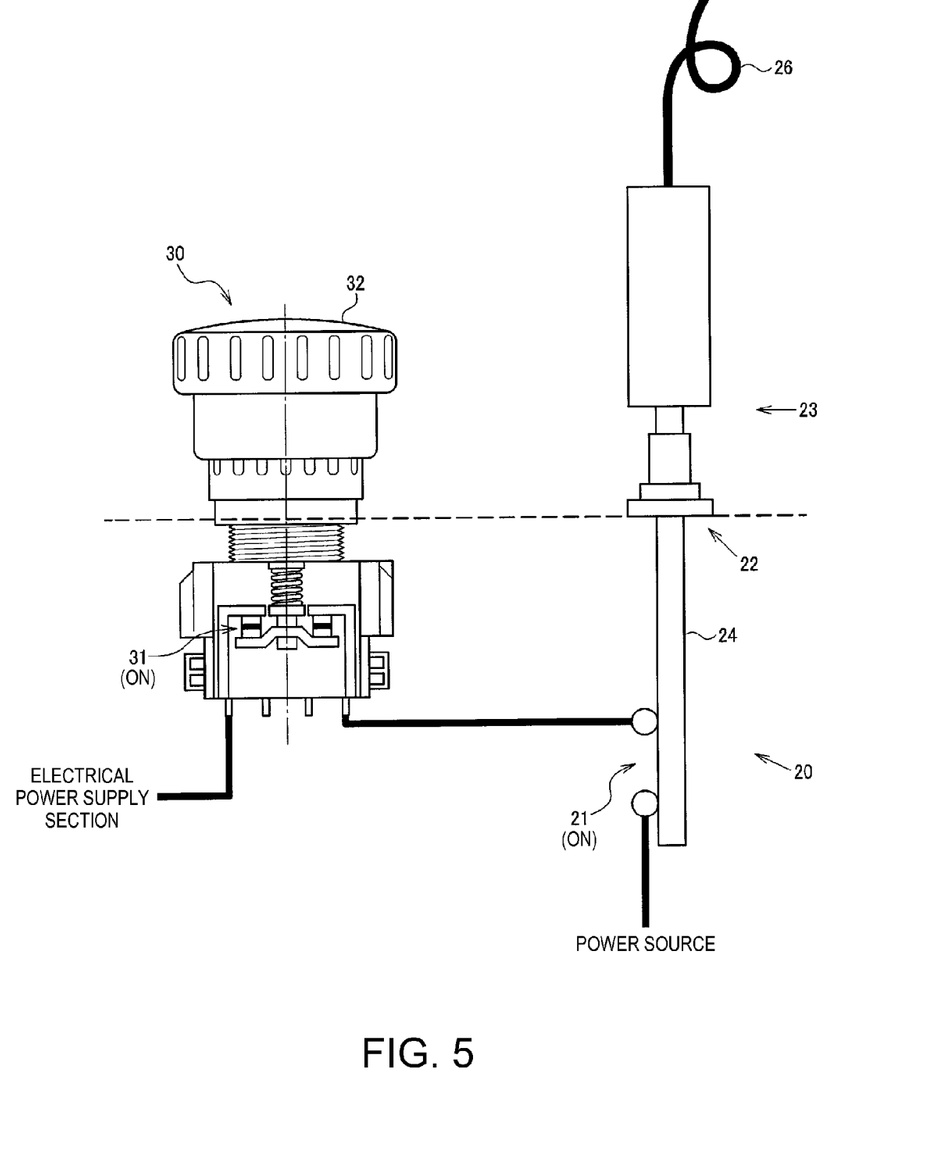
FIG. 5 is an explanatory diagram of a first configuration example of a switch section and an action thereof.

Then, a detailed configuration example of the switch sections and the action thereof will be explained. FIG. 5 is a diagram showing a first configuration example of the switch sections 20, 30.

In FIG. 5, the switch section 20 is formed of a pull-type switch, and the switch section 30 is formed of a push-type switch. Further, as shown in FIG. 3 described above, the switch section 20 of the pull type is disposed on the front side of the robot, the switch section 30 of the push type is disposed on the rear side of the robot.

The switch section 20 has a first switch 21 (a first contact point), and the second switch section 30 has a second switch 31 (a second contact point). These switches 21, 31 are disposed in series. For example, the switches 21, 31 are disposed in series to an electrical power supply line. Specifically, the switches 21, 31 are connected in series between an electrical power supply node of the electrical power supply section 10 and an electrical power input node of the power source 50 (the robot control section). It should be noted that although in FIG. 5, the switch 31 is disposed near to the electrical power supply node of the electrical power supply section 10, and the switch 21 is disposed near to the electrical power input node of the power source 50, the order of the connection can be inverted. Specifically, it is also possible to dispose the switch 21 near to the electrical power supply node, and the switch 31 near to the electrical power input node.

Further, in the present embodiment, when at least one of the switches 21, 31 is turned OFF, the electrical power supply to the power source 50 is blocked. Thus, the emergency stop of the robot is achieved.

For example, in FIG. 5, since the insertion section 24 of the connection member 23 is inserted in the insertion opening 22 of the switch section 20, and the insertion section 24 is formed of a conductor such as metal, the switch 21 is turned ON. Further, the switch 31 of the switch section 30 is also in the ON state. Therefore, since both of the switches 21, 31 connected in series to each other are in the ON state, the electrical power supply from the electrical power supply section 10 is appropriately supplied to the power source 50, and thus the normal operation of the robot is enabled.

Figure 6:
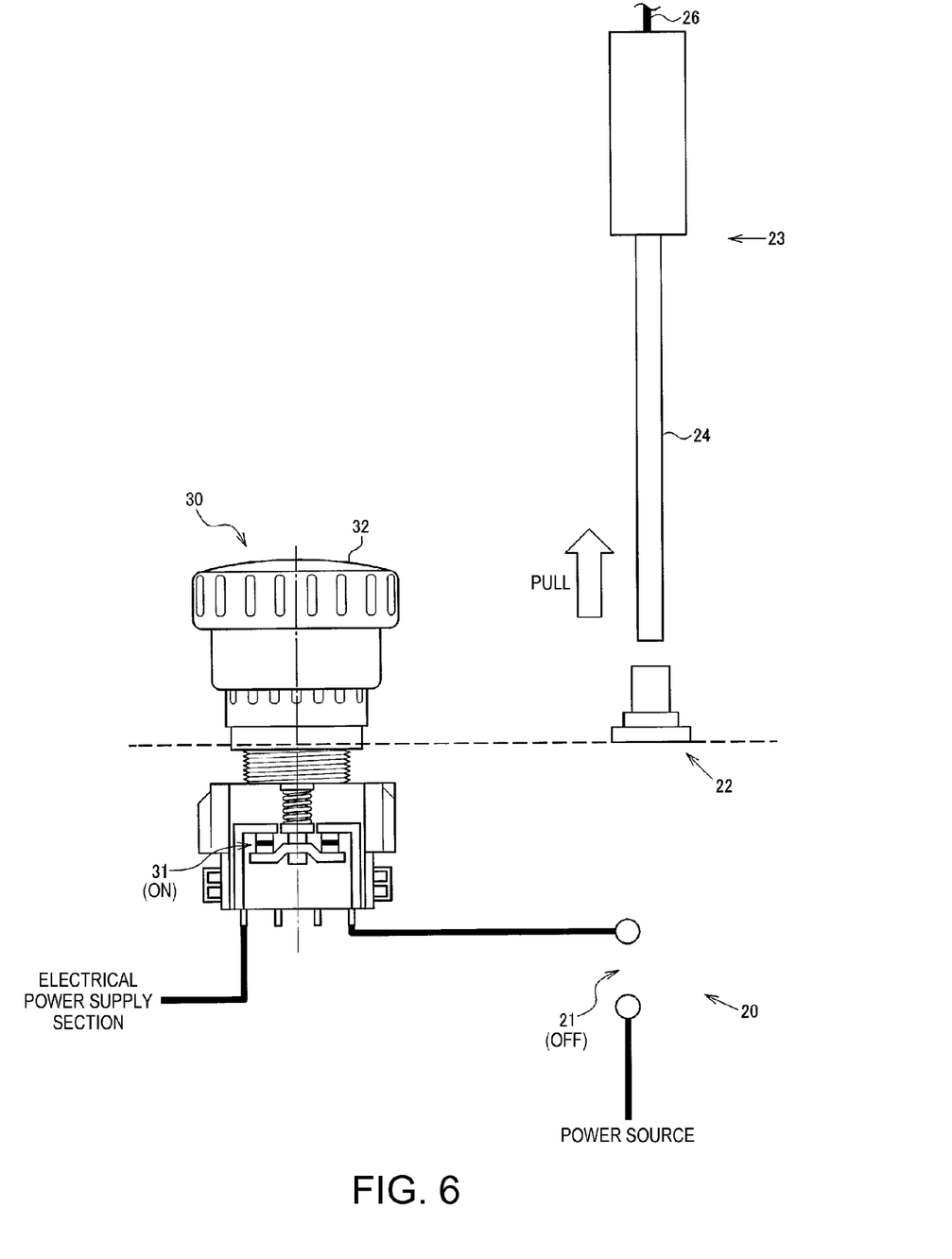
FIG. 6 is an explanatory diagram of the first configuration example of the switch section and the action thereof.

In contrast, in the FIG. 6, the insertion section 24 of the connection member 23 has been pulled out from the insertion opening 22 of the switch section 20 in accordance with the increase in the distance of the robot from the workbench 100 due to the abnormal state. By pulling out the insertion section 24 in such a manner, the insertion section 24 made of a conductor does not exist in the contact point of the switch 21 any more, and thus the switch 21 is turned OFF. Then, when the switch 21 is turned OFF, the electrical power supply from the electrical power supply section 10 to the power source 50 is blocked.

Figure 7:
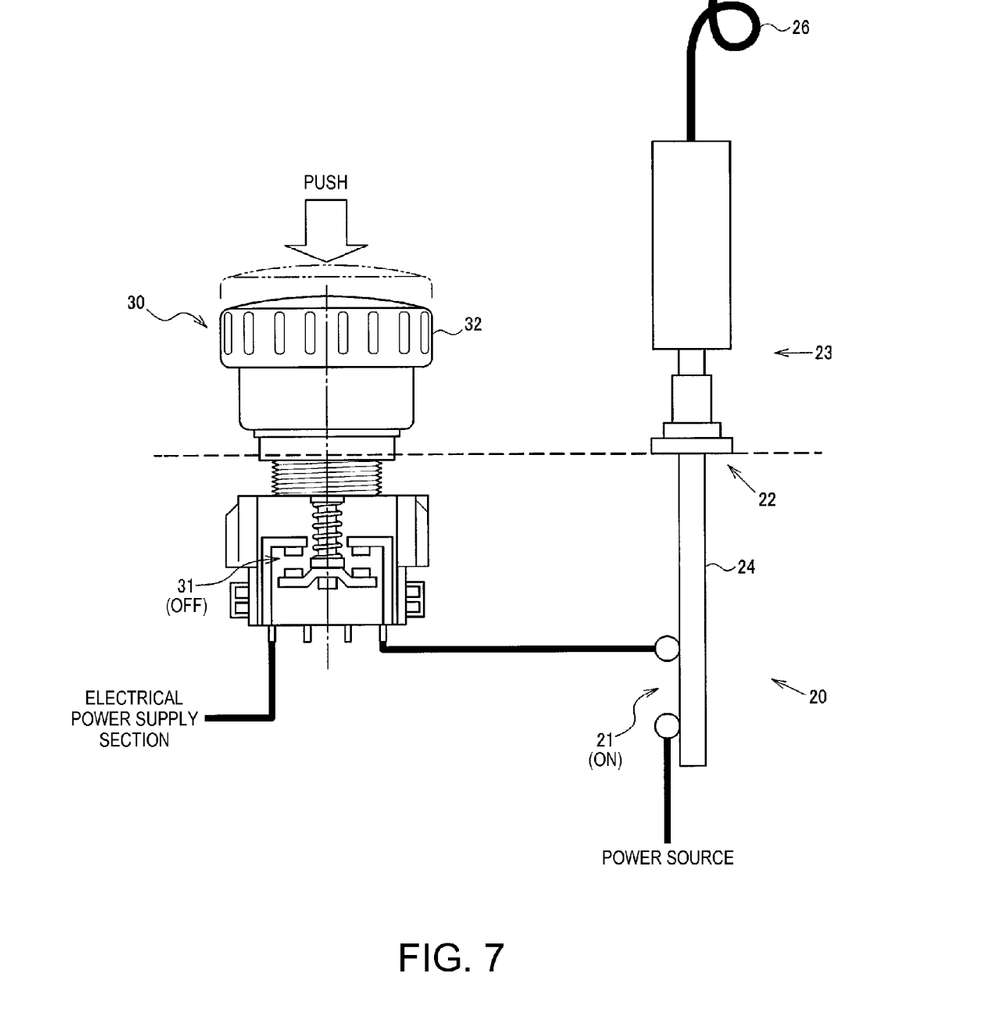
FIG. 7 is an explanatory diagram of the first configuration example of the switch section and the action thereof.

Further, in FIG. 7, the operator is pressing a knob section 32 of the switch section 30 of the push type. Then, the switch 31 is turned OFF, and the switch section 30 gets into a locked state in the present state. Then, when the switch 31 is turned OFF, the electrical power supply from the electrical power supply section 10 to the power source 50 is blocked.

As described above, in FIGS. 5 through 7, it results that the electrical power supply to the power source 50 is blocked by turning OFF either one of the switch sections 20, 30. Therefore, it becomes possible to perform the emergency stop of the robot in the abnormal state such as the unintended movement or the fall of the robot shown in FIG. 2B, and at the same time, perform the emergency stop of the robot by the operator pressing the switch section 30 in FIG. 3.

Figure 8A:
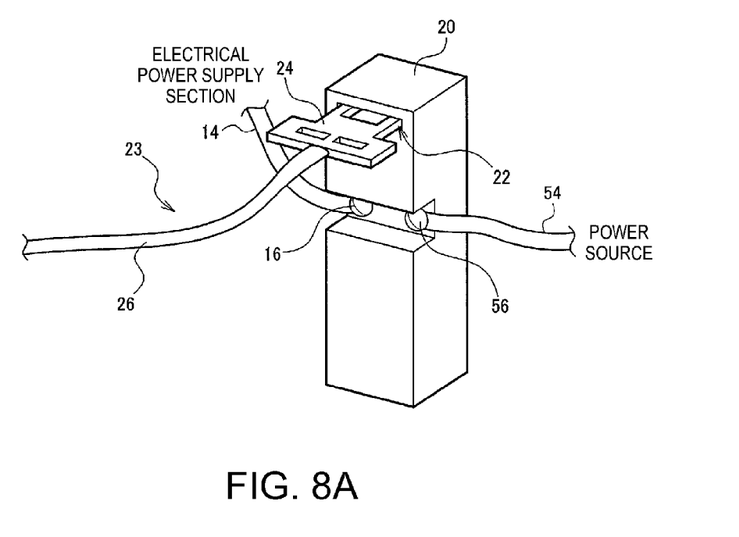
FIGS. 8A and 8B are explanatory diagrams of a second configuration example of the switch section and an action thereof.
Figure 8B:
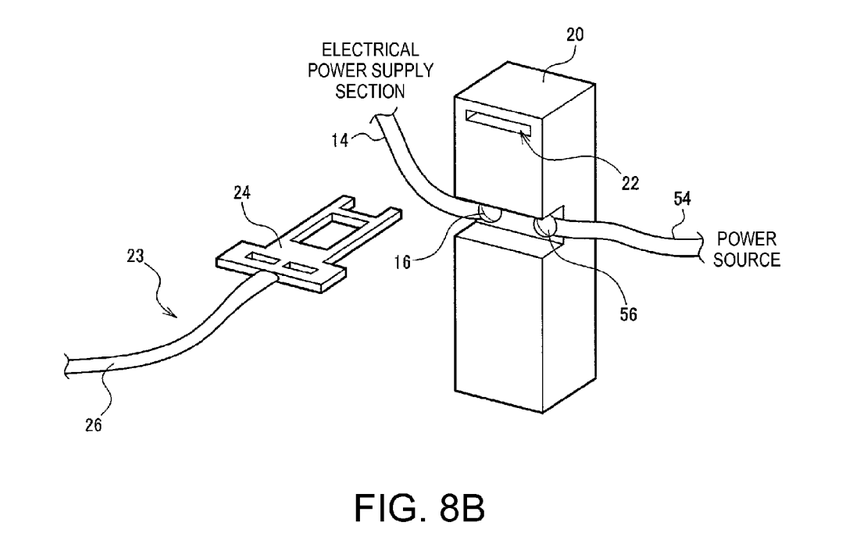

FIGS. 8A and 8B are diagrams showing a second configuration example of the switch section 20. In FIGS. 8A and 8B, the connection member 23 is formed of the insertion section 24 having a key shape, and the wire section 26. Further, the switch section 20 is provided with terminals 16, 56, wherein an electrical power supply line 14 from the electrical power supply section 10 is connected to the terminal 16, and an electrical power supply line 54 to the power source 50 (the robot control section) is connected to the terminal 56.

Further, in the normal operation of the robot, as shown in FIG. 8A, the insertion section 24 having the key shape is inserted in the insertion opening 22 of the switch section 20. When the insertion section 24 is inserted into the insertion opening 22 in such a manner, an electrically conductive state is established between the terminal 16 and the terminal 56, and thus, the electrical power supply line 14 from the electrical power supply section 10 and the electrical power supply line 54 to the power source 50 are electrically connected to each other. Therefore, it is possible to supply the power source 50 with the electrical power in the normal operation of the robot to make the robot operate appropriately.

In contrast, when the abnormal state shown in FIG. 2B occurs to move the robot away from the workbench 100, the insertion section 24 having the key shape is pulled out from the insertion opening 22 of the switch section 20 as shown in FIG. 8B. When the insertion section 24 is pulled out from the insertion opening 22 in such a manner, an electrically nonconductive state is established between the terminal 16 and the terminal 56, and thus, the electrical power supply line 14 from the electrical power supply section 10 and the electrical power supply line 54 to the power source 50 are electrically disconnected to each other. Therefore, it becomes possible to block the electrical power supply to the power source 50 in the abnormal state of the robot.

Figure 9A:
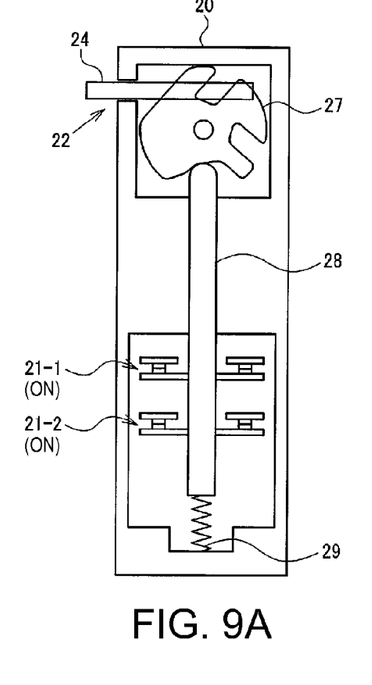
FIGS. 9A through 9C are also explanatory diagrams of the second configuration example of the switch section and the action thereof.
Figure 9B:
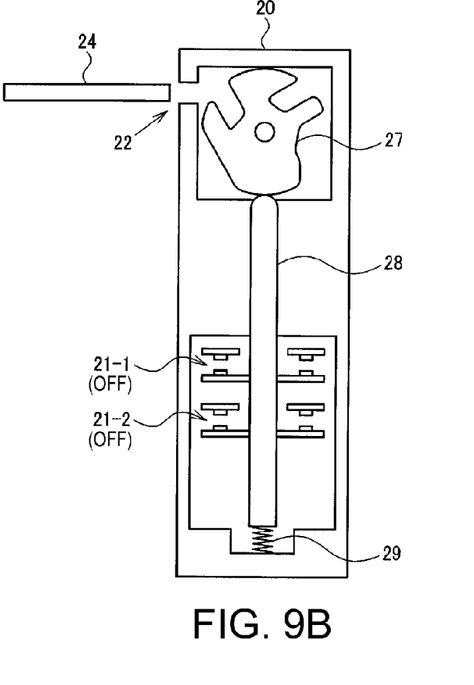
Figure 9C:
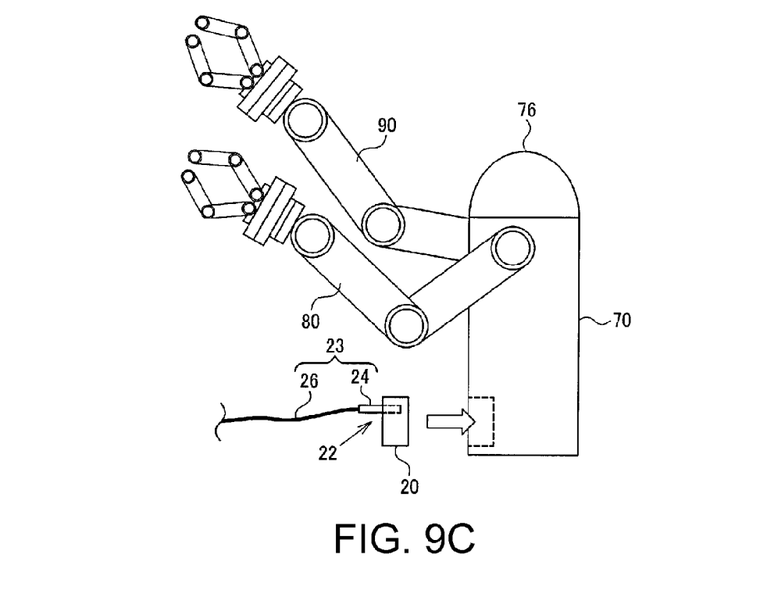

FIGS. 9A through 9C are diagrams showing an internal structure of the switch section 20 of the second configuration example.

In FIG. 9A, the insertion section 24 is inserted in the insertion opening 22 to establish the state in which a rotating body 27 is rotated clockwise. On this occasion, a rod-like member 28 is biased upward by a spring 29, and switches 21-1, 21-2 are turned ON. These switches 21-1, 21-2 are the switches to be connected in series between the terminals 16, 56 shown in FIG. 8A. As described above, by setting the switches 21-1, 21-2 to the ON state, the terminal 16 and the terminal 56 get into the electrically conductive state, and thus the electrical power supply from the electrical power supply section 10 becomes to be supplied to the power source 50 via the electrical power supply line 14, the terminal 16, the terminal 56, and the electrical power supply line 54. It should be noted that by disposing the two switches such as the switches 21-1, 21-2 forming the contact points, it becomes possible to enhance the reliability with respect to the emergency stop.

In contrast, in FIG. 9B, the insertion section 24 is pulled out from the insertion opening 22 to establish the state in which the rotating body 27 is rotated counterclockwise. Due to the rotation of the rotating body 27, the rod-like member 28 is moved downward, and thus the switches 21-1, 21-2 are turned OFF. Further, by turning OFF the switches 21-1, 21-2, the terminal 16 and the terminal 56 get into the electrically nonconductive state. Thus, the electrical power supply from the electrical power supply section 10 to the power source 50 is blocked to thereby perform the emergency stop of the robot.

Further, in the present embodiment, as shown in FIG. 9C, the switch section 20 having such a structure is incorporated on the front side of the robot. For example, the switch section 20 is disposed at the position on the lower side of the body section 70 of the robot. Further, for example, the switch section 20 is incorporated in the robot so that the insertion opening 22 shown in FIGS. 8A and 8B is exposed on the surface of the robot on the front side. By adopting such a configuration, it becomes possible to incorporate the switch section 20 of the pull type having a compact structure in the robot to simply and easily realize the emergency stop method according to the present embodiment explained with reference to FIGS. 2A and 2B. That is, the switch section 20 shown in FIGS. 9A and 9B has a compact structure, and the length of the insertion section 24 can also be shortened. Therefore, it becomes also easy to realize the method of preventing the connection member 23 from entering the inside of the movable range RM of the arms 80, 90 explained with reference to FIG. 4. Further, since the switch section 20 is small in size, there is an advantage that the switch section 20 does not hinder the installation space for other mechanical structures when incorporating the switch section 20 into the inside of the robot.

It should be noted that although the present embodiment is hereinabove explained in detail, it should easily be understood by those skilled in the art that it is possible to make a variety of modifications not substantially departing from the novel matters and the advantages of the invention. Therefore, such modified examples should be included in the scope of the invention. For example, a term described at least once with a different term having a broader sense or the same meaning in the specification or the accompanying drawings can be replaced with the different term in any part of the specification or the accompanying drawings. Further, all of the combinations of the working examples and the modified examples of the present embodiment are also included in the scope of the invention. Further, the configuration and the operation of the robot, the emergency stop method, the switch control method, the electrical power supply method, and so on are also not limited to those explained in the present embodiment, but can be put into practice in various modified forms.

The entire disclosure of Japanese Patent Application No. 2013-155343, filed Jul. 26, 2013 is expressly incorporated by reference herein.

What is claimed is:

1. A robot comprising:
a drive power source of the robot that moves the robot;
an electric power supply that supplies electric power to the drive power source of the robot;
a first switch that is provided on a front side of the robot, the front side facing a workbench; and
a second switch that is provided on a rear side of the robot, the rear side being opposite to the front side, wherein
the first and second switches are serially connected between the electric power supply and the drive power source via first and second lines so that the electric power from the electric power supply to the drive power source is blocked when at least one of the first and second switches is turned OFF,
the first switch is configured with:
an insertion conductor rod that is connected to the workbench;
an insertion opening that is provided on the front side of the robot, the insertion conductor rod is inserted through the insertion opening into the robot;
a first terminal that is provided at an end of the first line connected between the second switch and the first switch; and
a second terminal that is provided at an end of the second line connected between the first switch and the drive power source;
when the insertion conductor rod is inserted through the insertion opening so as to connect between the first and second terminals via the insertion conductor rod, the electric power from the electric power supply is supplied to the drive power source, and
when a distance between the workbench and the robot is longer than a predetermined distance, the insertion conductor rod is spaced apart from the first and second terminals so that the first switch is turned OFF.

2. The robot according to claim 1, wherein
one end of the insertion conductor rod is connected to the workbench, and the other end of the insertion conductor rod is inserted through the insertion opening, and
the first switch blocks the electrical power from the electric power supply to the drive power source when the other end of the insertion conductor rod is pulled out from the insertion opening.

3. The robot according to claim 2, wherein
the first switch includes
a wire having one end attached to the insertion conductor rod and the other end attached to the workbench, and
the first switch blocks the electrical power from the electric power supply to the drive power source when the insertion conductor rod is pulled out from the insertion opening.

4. The robot according to claim 2, further comprising:
a base; and
a body section rotatably supported by the base,
wherein the insertion opening is disposed on a front side of the body section.

5. The robot according to claim 4, further comprising:
at least one arm provided to the body section,
wherein the insertion conductor rod located outside a movable range of the arm in a state of being inserted in the insertion opening.

6. The robot according to claim 1, further comprising:
a robot controller adapted to control the robot,
wherein the first switch blocks the electrical power from the electric power supply to the drive power source and the robot controller when the distance between the workbench and the robot is longer than the predetermined distance.

7. An emergency stop method of a robot that includes:
a drive power source of the robot that moves the robot;
an electric power supply that supplies electric power to the drive power source of the robot;
a first switch that is provided on a front side of the robot, the front side facing a workbench; and
a second switch that is provided on a rear side of the robot, the rear side being opposite to the front side, the emergency stop method comprising:
detecting whether a distance between the robot and the workbench is longer than a predetermined distance; and
blocking the electrical power from the electric power supply to the drive power source of the robot in accordance with a detection result in the detecting by turning the first switch OFF, wherein
the first and second switches are serially connected between the electric power supply and the drive power source via first and second lines so that the electric power from the electric power supply to the drive power source is blocked when at least one of the first and second switches is turned OFF,
the first switch is configured with:
    an insertion conductor rod that is connected to the workbench;
    an insertion opening that is provided on the front side of the robot, the insertion conductor rod is inserted through the insertion opening into the robot;
    a first terminal that is provided at an end of the first line connected between the second switch and the first switch; and
    a second terminal that is provided at an end of the second line connected between the first switch and the drive power source;
when the insertion conductor rod is inserted through the insertion opening so as to connect between the first and second terminals via the insertion conductor rod, the electric power from the electric power supply is supplied to the drive power source; and
when the distance between the workbench and the robot is longer than the predetermined distance, the insertion conductor rod is spaced apart from the first and second terminals so that the first switch is turned OFF.

8. A robot comprising:
a drive power source of the robot that moves the robot;
an electric power supply that supplies electric power to the drive power source of the robot;
a first switch that is provided on a front side of the robot, the front side facing a workbench; and
a second switch that is provided on a rear side of the robot, the rear side being opposite to the front side,
wherein the first and second switches are serially connected between the electric power supply and the drive power source via first and second lines so that the electric power from the electric power supply to the drive power source is blocked when at least one of the first and second switches is turned OFF,
the first switch is configured with:
    an insertion key plate that is connected to the workbench;
    an insertion slit opening that is provided on the front side of the robot, the insertion key plate is inserted through the insertion opening into the robot;
    a first terminal that is provided at an end of the first line connected between the second switch and the first switch; and
    a second terminal that is provided at an end of the second line connected between the first switch and the drive power source;
when the insertion key plate is inserted through the insertion opening so as to connect between the first and second terminals, the electric power from the electric power supply is supplied to the drive power source, and
when a distance between the workbench and the robot is longer than a predetermined distance, the insertion key plate is pulled out from the insertion slit opening so that the first switch is turned OFF.

9. The robot according to claim 8,
wherein one end of the insertion key plate is connected to the workbench, and the other end of the insertion key plate is inserted through the insertion slit opening, and
the first switch blocks the electrical power from the electric power supply to the drive power source when the other end of the insertion key plate is pulled out from the insertion slit opening.

10. The robot according to claim 9,
wherein the first switch includes a wire having one end attached to the insertion key plate and the other end attached to the workbench.

11. The robot according to claim 9, further comprising:
a base; and
a body section rotatably supported by the base,
wherein the insertion slit opening is disposed on a front side of the body section.

12. The robot according to claim 11, further comprising:
at least one arm provided to the body section,
wherein the insertion key plate located outside a movable range of the arm in a state of being inserted in the insertion slit opening.

13. The robot according to claim 8, further comprising:
a robot controller adapted to control the robot,
wherein the first switch blocks the electrical power from the electric power supply to the drive power source and the robot controller when the distance between the workbench and the robot is longer than the predetermined distance.

* * * * *